United States Patent [19]

Grauer et al.

[11] Patent Number: 5,314,966
[45] Date of Patent: May 24, 1994

[54] PROCESS FOR THE PREPARATION OF A FINELY DIVIDED VINYL CHLORIDE GRAFT COPOLYMER AND ITS USE AS VISCOSITY-REDUCING AGENT AND FLATTING AGENT

[75] Inventors: Peter Grauer, Burgkirchen; Ludwig Ober, Burghausen, both of Fed. Rep. of Germany

[73] Assignee: Wacker Chemie GmbH, Munich, Fed. Rep. of Germany

[21] Appl. No.: 30,287

[22] PCT Filed: Sep. 12, 1991

[86] PCT No.: PCT/EP91/01740

§ 371 Date: Mar. 17, 1993

§ 102(e) Date: Mar. 17, 1993

[87] PCT Pub. No.: WO92/05210

PCT Pub. Date: Apr. 2, 1992

[30] Foreign Application Priority Data

Sep. 17, 1990 [DE] Fed. Rep. of Germany ....... 4029471

[51] Int. Cl.$^5$ .................... C08F 265/04; C08L 51/00; C08K 5/12
[52] U.S. Cl. .................... 525/317; 525/252; 525/258; 525/281; 525/302; 525/308; 525/309; 524/504
[58] Field of Search ............... 525/252, 258, 263, 308, 525/317, 281, 302, 309; 524/504

[56] References Cited

U.S. PATENT DOCUMENTS

| 3,891,723 | 6/1975 | Nicolet et al. . |
| 4,162,239 | 7/1979 | Nicolet et al. . |
| 4,525,559 | 6/1985 | Sielfeld et al. . |
| 4,719,265 | 1/1988 | Thunig et al. . |
| 4,939,212 | 7/1990 | Mikofalvy et al. ............... 525/271 |
| 5,185,406 | 2/1993 | Grauer . |

FOREIGN PATENT DOCUMENTS

| 3132890 | 3/1983 | Fed. Rep. of Germany . |
| 3544235 | 6/1987 | Fed. Rep. of Germany . |
| 3700973 | 7/1988 | Fed. Rep. of Germany . |
| 3803036 | 8/1989 | Fed. Rep. of Germany . |
| 566354 | 9/1975 | Switzerland . |
| 616168 | 3/1980 | Switzerland . |

OTHER PUBLICATIONS

Derwent–Abstract AN 88–213481, Jul. 1988.
Derwent–Abstract AN 87–170969, Jun. 1987.
Derwent–Abstract AN 75–57725, Jan. 1975.

Primary Examiner—Vasu S. Jagannathan
Attorney, Agent, or Firm—Burgess, Ryan & Wayne

[57] ABSTRACT

The present invention is directed to a process for the preparation of a finely divided vinyl chloride graft copolymer and to the use of this product as a viscosity-reducing agent for plastisols.

12 Claims, No Drawings

PROCESS FOR THE PREPARATION OF A FINELY DIVIDED VINYL CHLORIDE GRAFT COPOLYMER AND ITS USE AS VISCOSITY-REDUCING AGENT AND FLATTING AGENT

The invention relates to the preparation of a finely divided vinyl chloride graft copolymer and to the use of the process product as viscosity-reducing agent for plastisols or as flatting agent for thermoplastic resins and plastisols.

In DE-A 3,132,890, the preparation of a finely divided vinyl chloride graft copolymer grafted onto an ethylene/vinyl acetate copolymer is described. In this reaction, the graft copolymer is prepared after dissolving the ethylene/vinyl acetate solid resin present in the absence of emulsifier and is suitable in particular for use as viscosity-reducing agent in plastisols. The disadvantage of this method is the complicated dissolution of solid resin, which on top of everything can lead to inhomogeneities with respect to the graft copolymer composition.

In DE-A 3,544,235, a plastisol composition is described which contains a finely divided, crosslinked vinyl chloride graft copolymer grafted onto an ethylene/vinyl acetate copolymer for reducing the viscosity and for flatting. This graft copolymer is also prepared by the suspension polymerization process, in which the ethylene/vinyl acetate solid resin is dissolved in monomeric vinyl chloride before the start of the polymerization.

DE-A 3,803,036 describes the preparation of a vinyl chloride graft copolymer with crosslinked polybutyl acrylate as the graft base. The elastomer content is up to 65% by weight; the vinyl chloride is grafted on only after the polybutyl acrylate has coagulated. It is not possible to prepare finely divided vinyl chloride graft copolymers by this method; coarse polymer particles of irregular shape are formed.

The object of the invention was to develop a process for the preparation of a finely divided vinyl chloride graft copolymer which is suitable for use as viscosity-reducing agent or flatting agent, while avoiding the abovementioned disadvantages.

The invention relates to a process for the preparation of a finely divided vinyl chloride graft copolymer having an average particle size of 20 to 30 μm by the suspension polymerization process in the presence of monomer-soluble free radical initiators and further conventional additives, such as buffer substances or emulsifiers, characterised in that the graft monomer is polymerized in the presence of 1.0 to 5.0% by weight, relative to the graft monomer content, of an alkyl acrylate polymer which is initially introduced in an aqueous emulsion having a solids content of 30 to 60% by weight, and 0.1 to 1.0% by weight, relative to the graft monomer content, of a cellulose ether having a methoxy content of 15 to 25% and a hydroxypropyl content of 3 to 10% and having a viscosity of 30 to 150 mPa.s according to ASTM D 2363, which is initially introduced or metered in after addition of the graft monomer.

To prepare the vinyl chloride graft copolymer, the polyalkyl acrylate emulsion is initially introduced together with the water, the free radical initiators and, if appropriate, the buffer substances and further customary additives. The graft monomer is then metered in. The protective colloid can be initially introduced or it can be metered in after addition of the graft monomer. The polymerization is carried out at a temperature of 50° to 80° C., preferably 55° to 70° C. At a drop in pressure of 1 to 5 bar, preferably 3 to 5 bar, the polymerization is stopped by distilling off the unreacted vinyl chloride. After degassing, the product is freed from water in a centrifuge and dried.

Uncrosslinked homopolymers or crosslinked copolymers of alkyl acrylates having $C_2$- to $C_8$-alkyl radicals are used as the graft base. Examples of these are polyethyl acrylate, polybutyl acrylate and poly(2-ethylhexyl) acrylate. Alkyl acrylate copolymers used are those containing 0.1 to 1.0% by weight, relative to the alkyl acrylate content, of ethylenically polyunsaturated comonomers which have a crosslinking action. Examples of these are vinyl and allyl esters of unsaturated $C_3$- to $C_8$-monocarboxylic acids, such as allyl methacrylate; mono-or divinyl and -allyl esters of saturated or unsaturated $C_4$- to $C_{10}$-dicarboxylic acids, for example diallyl phthalate; and di(meth)acrylic and tri(meth)acrylic esters of polyhydric alcohols, diethylene glycol dimethacrylate or trimethylolpropane trimethacrylate; triallyl cyanurate and other allyl ethers of polyfunctional alcohols. Preferably, crosslinked copolymers of alkyl acrylates are used as the graft base. Polybutyl acrylate crosslinked with 0.1 to 1.0% by weight of allyl methacrylate is particularly preferably used. Relative to the graft monomer, 1 to 5% by weight, preferably 1 to 3% by weight, of the alkyl acrylate polymer are used.

The graft base is prepared in a manner known per se in an emulsion polymerization process. To prepare the graft copolymer, the uncrosslinked or crosslinked alkyl acrylate polymer is used as aqueous latex having a solids content of 30 to 60% by weight. In a preferred embodiment, 0.01 to 0.5% by weight, relative to the graft monomer content, of an anionic emulsifier is added to the aqueous latex before use in the preparation process according to the invention. Suitable anionic emulsifiers are alkylsulfates having 8 to 18 C atoms, alkylsulfonates having 8 to 18 C atoms, alkali metal salts and ammonium salts of carboxylic acids having 8 to 20 C atoms, and hydrogen phosphates and alkyl ether phosphates. Preferably, alkylsulfonates and alkylsulfates having 8 to 18 C atoms are used.

Vinyl chloride is preferably used as the graft monomer. However, it is also possible to use up to 20% by weight of monomers copolymerizable with vinyl chloride, such as vinyl esters of aliphatic monocarboxylic acids of 2 to 12 carbon atoms or alkyl (meth)acrylates having a $C_2$- to $C_{12}$-alkyl radical. To prepare crosslinked graft copolymers, up to 10% by weight, preferably 0.01 to 5.0% by weight, of the abovementioned ethylenically polyunsaturated comonomers having a cross-linking action can contain [sic] to the graft monomer phase. The graft monomer phase preferably contains 0.01 to 5.0% by weight of triallyl cyanurate.

0.1 to 1.0% by weight, relative to the graft monomer content, of a cellulose ether having a methoxy content of 15 to 25% and a hydroxypropyl content of 3 to 10% and a viscosity of 30 to 150 mPa.s according to ASTM D 2363 is used as protective colloid. The protective colloid is preferably metered in as a 1 to 5% strength by weight aqueous solution.

The initiators used are monomer-soluble free radical formers from the group of peroxides and azo initiators. Examples of customary peroxides are dialkyl, diacyl and diaroyl peroxides, such as dilauroyl or diacetyl peroxide; or peroxodicarbonates, such as ditert.-butylcyclohexyl peroxodicarbonate and dicetyl peroxodicarbonate; or peresters. Customary azo initiators are azobisisobutyronitrile or azobisdimethylvaleronitrile. If desired, the peroxide initiators can also be used in a mixture with reducing agents. The initiators are preferably used in an amount of 0.01 to 1.50% by weight, relative to the graft monomers.

The buffer substances used are usually sodium carbonate, sodium hydrogen phosphate, alkali metal phosphates and alkali metal acetates in concentrations of 0.005 to 0.5% by weight, relative to the graft monomers.

Further additives customary in the polymerization are, for example, regulators for adjusting the K value of the graft product, such as chlorohydrocarbons, for example dichloroethylene, trichloroethylene, chloroform, or aliphatic aldehydes, which are used in amounts of up to 5% by weight, relative to the graft monomers.

The process according to the invention makes vinyl chloride graft copolymers accessible which are distinguished by very finely divided particles having an average particle size of 20 to 30 $\mu$m and a narrow particle size distribution.

The vinyl chloride graft copolymers according to the invention are suitable in particular for use as viscosity-reducing additive in plastisol compositions and for use as flatting agent for thermoplastic resins and plastisols.

To modify the paste viscosity, 5 to 50% by weight, relative to the entire polymer in the paste, of the vinyl chloride graft copolymer according to the invention are used. The graft copolymer preferably contains 1 to 5% by weight of polybutyl acrylate cross-linked with 0.1 to 1.0% by weight of allyl methacrylate, relative to the graft base, and 95 to 99% by weight of vinyl chloride. For modification, the graft copolymer is admixed in the abovementioned amount in a known manner with polyvinyl chloride suitable for processing as a paste, usually emulsion or microsuspension PVC in an amount of preferably 50 to 95% by weight; and plasticizers, for example based on dicarboxylic and phosphoric esters, in an amount of 20 to 200% by weight, relative to the entire polymer content; and, if desired, further additives, such as, for example, light and heat stabilizers, pigments and fillers. The preparation and composition of PVC plastisols is described, for example, in H. Kainer, Polyvinylchlorid and Vinylchlorid-Mischpolymerisate (Polyvinyl chloride and vinyl chloride copolymers), Springer-Verlag, Berlin—Heidelberg—New York (1965).

One of the main areas of application of PVC plastisols is the preparation of coatings on base materials by brush application, for example the coating of fabrics or paper. Due to the very fine particles of the vinyl chloride graft copolymers prepared according to the invention, plastisols modified therewith are suitable in particular for the preparation of thin layers by brush application, for example in wallpaper coating.

When used as flatting agent for thermoplastic resins, such as, for example, polyvinyl chloride or copolymers of vinyl chloride or graft copolymers of vinyl chloride, 1 to 50% by weight, relative to the entire polymer content, of the vinyl chloride graft copolymer according to the invention are used. When processed to a thermoplastic, preferably 2 to 10% by weight and, when processed to a plastisol, 10 to 50% by weight of the resin to be flatted are used. Crosslinked vinyl chloride graft copolymers containing 0.01 to 5.0% by weight of ethylenically polyunsaturated comonomers having a cross-linking action in the graft monomer phase are particularly suitable for use as flatting agents. Crosslinked vinyl chloride graft copolymers having a crosslinked polyacrylate graft base are especially suitable.

The recipes for processing without plasticizer, processing with plasticizer and plastisol processing to give thermoplastic resins, specifically VC polymers, are generally known. It will be appreciated that the additives customary in each case can of course also be used according to the invention, for example plasticizers, such as those based on dicarboxylic and phosphoric esters, light and heat stabilizers, for example based on Zn, Cd, Ba, Sn, Pb, Ca, processing aids, for example based on acrylate, lubricants, impact resistance modifiers, pigments or fillers. These additives can be used in the usual amounts.

Owing to the very fine particles of the vinyl chloride graft copolymers according to the invention, an excellent, highly uniform flatting effect is obtained upon visual evaluation. Especially in the case of cross-linked vinyl chloride graft copolymers, this flatting effect is virtually independent of the usual processing conditions, due to their stable shearing behaviour.

The vinyl chloride graft copolymers prepared according to the invention can be processed not only by calendering, but also by extrusion in plasticized form and injection molding.

The examples which follow serve to illustrate the invention further:

EXAMPLES 1 TO 8 (TABLE 1)

The water together with the buffer substances and the amount of initiator and crosslinking agent stated in Table 1 were initially introduced into a 2.5 m$^3$ pilot-plant autoclave. The graft base was metered into the initial mixture after adding the corresponding amount of emulsifier to the latex. The vinyl chloride was then injected and the protective colloid was then metered in in a 3% strength aqueous solution. The polymerization was carried out at a temperature of 59° C. until the drop in pressure was 3 bar. The batch was then degassed, and the polymer was filtered off and dried.

The graft base used was polybutyl acrylate cross-linked with 0.175% by weight of allyl methacrylate as a 40% strength aqueous latex.

The graft monomer phase was crosslinked in the examples with TAC=triallyl cyanurate.

MHPC=Methylhydroxypropylcellulose having a methoxy degree of substitution of 23%, a hydroxypropyl degree of substitution of 7% and a viscosity of 100 mPa.s.

The following emulsifiers were added to the polyacrylate latices:

Mersolat K30=Mixture of various paraffin sulfonates having an average chain length of 14–15 C atoms from Bayer AG.

Texapon K12=Sodium laurylsulfate from Henkel KGaA

The following initiators were used:

CEPC=dicetyl peroxodicarbonate, LPO=lauroyl peroxide

COMPARATIVE EXAMPLES A TO E (TABLE 2)

Comparative Example A

The procedure was analogous to Example 2, except that a conventional vinyl chloride suspension polymer was prepared without initially introducing the graft base and without adding emulsifier. Owing to the coarser particles of the products of Comparative Example A compared with Example 2, it is impossible to apply thin films.

Comparative Example B

The procedure was analogous to Example 1, except that, following the methods discussed as the prior art, an ethylene/vinyl acetate solid resin having a vinyl acetate content of 45% by weight was used as the graft base.

Comparative Example C

The procedure was analogous to Example 1, except that a conventional vinyl chloride suspension polymer was prepared without initially introducing a graft base and with the addition of emulsifier.

Comparative Example D

The procedure was analogous to Example 5, except that a suspension PVC crosslinked with triallyl cyanurate was prepared without the addition of a graft base and without the addition of emulsifier. Compared with Example 5, the flatting effect is greatly dependent on the processing conditions as demonstrated by means of a calendered film, in which the molding compound was preplasticized by an extruder instead of mixing rolls. The coarse particles of the products of Comparative Example D lead to an unsatisfactory surface structuring in the case of processing in an extruder.

Comparative Example E

The procedure was analogous to Comparative Example D, except that twice the amount of triallyl cyanurate was used. Owing to the coarse particles, an unsatisfactory flatting effect together with coarse surface structuring is obtained.

The results of the determination of the insoluble portion and the tests measuring plasticizer absorption and paste viscosity are summarized in Tables 3 and 4:

Insoluble portion

To determine the insoluble portion, a weighed 1 g sample was placed in a Soxleth [sic] extractor and extracted with 500 ml of THF under reflux for 24 hours. The THF phase was isolated, the THF distilled off, and the portion dissolved in the THF weighed.

Plasticizer absorption

The plasticizer absorption was determined by the centrifugation method according to DIN 53417 Part 1.

Paste viscosity

To determine the paste viscosity, pastes were prepared by the following recipe:

50 parts of Vinnol P 70 (microsuspension PVC having a K value of 70 from Wacker-Chemie) were made into a paste with 50 parts of test product and 50 parts of dioctyl phthalate and temperature controlled at 25° C. After 4 hours, the viscosity was measured using a Brookfield viscometer at 10 rpm.

The results of the determination of the flatting effect are summarized in Table 5:

The flatting effect was determined not only for the processing without plasticizer and the processing with plasticizer but also for the processing in the form of a paste. The following recipes were used:

Processing without plasticizer 100 parts of Vinnol Y 60 MS (bulk PVC having a K value of 60 from Wacker-Chemie) were mixed with 10 parts of test product, 1.5 parts of Irgastab 17 MOK (tin octylmercaptide [sic] from Ciba-Geigy), 0.5 part of Loxiol G 16 (glycine monooleate from Henkel KGaA) and 0.5 part of lubricant wax E (montanic ester from Hoechst AG).

Processing with plasticizer 100 parts of Vinnol H 70 DF (suspension PVC having a K value of 70 from Wacker-Chemie) were mixed with 10 parts of test product, 40 parts of dioctyl phthalate and 2 parts of Irgastab BZ 555 (Ba/Zn stabilizer from Ciba-Geigy).

The preplasticizing of the mixtures was carried out on mixing rolls at 165° C. or in a plasticizing extruder at 160° to 175° C. both in processing without plasticizer and processing with plasticizer. The mixtures were finally calendered to give films 200 μm thick. Processing in the form of paste:

The pastes were prepared in accordance with the paste recipes in order to determine the plastisol viscosity. The plastisol composition was used to prepare a coating 200 μm thick, which was gelled in the heat and cooled, and the flatting effect of the film obtained was determined.

The flatting effect was evaluated visually and classified as follows:

0 = glossy surface,
1 = matt surface, no surface structures detectable with the eye,
2 = matt surface, fine surface structuring,
3 = matt surface, coarser surface structuring,
4 = glossy surface, coarse "sand-blasted" surface structuring.

TABLE 1

| Parts | Ex. 1 | Ex. 2 | Ex. 3 | Ex. 4 | Ex. 5 | Ex. 6 | Ex. 7 | Ex. 8 |
|---|---|---|---|---|---|---|---|---|
| Graft base | 3.0 PBuA | 3.0 PBuA | 3.0 PBuA | 3.0 PBuA | 3.0 PBuA | 3.0 PBuA | 2.0 PBuA | 1.0 PBuA |
| Vinyl chloride | 100 | 100 | 100 | 100 | 100 | 100 | 100 | 100 |
| Crosslinking agent | — | — | 0.02 TAC | 0.10 TAC | 0.20 TAC | 0.40 TAC | 0.20 TAC | 0.20 TAC |
| Water | 140 | 140 | 140 | 140 | 140 | 140 | 140 | 140 |
| Protective colloid | 0.58 MHPC | 0.48 MHPC | 0.48 MHPC | 0.63 MHPC | 0.58 MHPC | 0.58 MHPC | 0.63 MHPC | 0.63 MHPC |
| Emulsifier | 0.06 K30 | — | 0.06 K30 | 0.06 K30 | 0.06 K30 | 0.06 K30 | 0.04 K30 | 0.02 K30 |
| Initiator | CEPC/LPO 0.06/0.03 | CEPC/LPO 0.06/0.03 | CEPC/LPO 0.06/0.03 | CEPC/LPO 0.06/0.03 | CEPC/LPO 0.06/0.03 | CEPC/LPO 0.06/0.03 | CEPC/LPO 0.06/0.03 | CEPC/LPO 0.06/0.03 |
| Poly. temp. (°C.) | 59 | 59 | 59 | 59 | 59 | 59 | 59 | 59 |

TABLE 2

|  | Comp. Ex. A | Comp. Ex. B | Comp. Ex. C | Comp. Ex. D | Comp. Ex. E |
| --- | --- | --- | --- | --- | --- |
| Graft base (parts) | — | 5.0 VAE | — | — | — |
| Vinyl chloride (parts) | 100 | 100 | 100 | 100 | 100 |
| Crosslinking agent (parts) | — | — | — | 0.20 TAC | 0.40 TAC |
| Water (parts) | 140 | 140 | 140 | 140 | 140 |
| Protective colloid (parts) | 0.58 MHPC | 0.30 MHPC | 0.58 MHPC | 0.58 MHPC | 0.58 MHPC |
| Emulsifier (parts) | — | 0.15 K12 | 0.06 K30 | — | — |
| Initiator (parts) | CEPC/LPO 0.08/0.03 | LPO 0.08 | CEPC/LPO 0.06/0.03 | CEPC/LPO 0.06/0.03 | CEPC/LPO 0.06/0.03 |
| Poly. temp.(°C.) | 59 | 60 | 59 | 59 | 59 |

TABLE 3

|  | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- |
| Average particle diameter (μm) | 28 | 26 | 28 | 25 | 27 | 27 | 29 | 27 |
| Insoluble portion (%) | 4 | 4 | 4 | 17 | 55 | 80 | 55 | 56 |
| Plasticizer absorption (%) | 19.5 | 7.3 | 17.9 | 13.0 | 22.1 | 31.4 | 12.1 | 9.0 |
| Plastisol viscosity (Pa · s) | 10.5 | 2.2 | 7.9 |  | 14.8 |  |  |  |

TABLE 4

|  | Comp. Ex. A | Comp. Ex. B | Comp. Ex. C | Comp. Ex. D | Comp. Ex. E |
| --- | --- | --- | --- | --- | --- |
| Average particle diameter (μm) | 36 | 15 | 30 | 37 | 39 |
| Insoluble portion (%) | 0 | 0 | 0 | 43 | 78 |
| Plasticizer absorption (%) | 8.4 | 13.8 | 19.6 | 12.3 | 10.7 |
| Plastisol viscosity (Pa · s) | 2.4 | 3.7 | 18.5 |  |  |

TABLE 5

| Additive | Film without plasticizer | | Film with plasticizer | |
| --- | --- | --- | --- | --- |
|  | Mixing rolls | Extruder | Mixing rolls | Extruder |
| Ex. 1 | 1 | 1 | 1 | 1 |
| Ex. 2 | 1 | 1 | 1 | 1 |
| Ex. 4 | 1 | 3 | 1 | 3 |
| Ex. 5 | 3 | 3 | 2-3 | 3 |
| Ex. 6 | 3 | 3 | 3 | 3 |
| Comp. Ex. D | 1 | 4 | 1 | 4 |
| Comp. Ex. E | 4 | 4 | 4 | 4 |

The pastes prepared in Example 1, 3, 5 and Comparison Example A were tested for surface gloss as described
Example 1: 0-1
Example 3: 0-1
Exmaple 5: 2
Comparative Example A: 0

We claim:

1. Process for the preparation of a finely divided vinyl chloride graft copolymer having an average particle size of 20 to 30 μm by a suspension polymerization process in the presence of monomer-soluble free radical initiators and further conventional additives, such as buffer substances or emulsifiers, consisting essentially of polymerizing a graft monomer in the presence of 1.0 to 5.0% by weight, relative to the graft monomer content, of an alkyl acrylate polymer which is initially introduced in a aqueous emulsion having a solids content of 30 to 60% by weight, and 0.1 to 1.0% by weight, relative to the graft monomer content, of a cellulose ether having a methoxy content of 15 to 25% and a hydroxypropyl content of 3 to 10% and having a viscosity of 30 to 150 mPa.s according to ASTM D 1363, which is initially introduced or metered in after addition of the graft monomer.

2. Process according to claim 1, characterized in that the graft monomer comprises vinyl chloride.

3. The process of claim 2 wherein the alkyl acrylate polymer comprises polybutyl acrylate.

4. The process of claim 2 wherein the alkyl acrylate polymer contains 0.1 to 1.0% by weight relative to the alkyl acrylate portion, of ethylenically polyunsaturated comonomer residues which have a crosslinking action.

5. The process of claim 4 wherein the ethylenically polyunsaturated comonomer residues comprise allyl methacrylate.

6. The process of claim 2 wherein the vinyl chloride graft monomer further comprises 0.1 to 5.0% of ethylenically polyunsaturated comonomers having a crosslinking action based on the weight of monomers and comonomers.

7. Process according to claim 1, characterized in that the alkyl acrylate polymer comprises polybutyl acrylate.

8. Process according to claim 1, characterized in that the alkyl acrylate polymer contains 0.1 to 1.0% by weight, relative to the alkyl acrylate portion, of ethylenically polyunsaturated comonomer residues which have a crosslinking action.

9. Process according to claim 1, characterized in that the alkyl acrylate polymer comprises polybutyl acrylate crosslinked with 0.1 to 1.0% be weight of allyl methacrylate.

10. Process according to claim 1, characterized in that the graft monomer contains 0.1 to 5.0% by weight of ethylenically polyunsaturated comonomers having a crosslinking action, based on the weight of monomer and comonomers.

11. A process for reducing the viscosity of a plastisol paste comprising vinyl chloride which comprises incorporating from 5 to 50% by weight of the vinyl chloride graft copolymer of claim 1 into 50 to 95% by weight of polyvinyl chloride and 20 to 200% by weight of plasticizers, in each case the percent by weight is relative to the polymer content of the paste.

12. A process for preparing an improved thermoplastic resin or plastisol which comprises mixing from 1 to 50% by weight of the vinyl chloride graft copolymer of claim 1 with from 99 to 50% by weight of the thermoplastic resin or plastisol, the percentage is based on the polymer content of the mixture.

* * * * *